United States Patent
Chen et al.

(10) Patent No.: US 7,530,714 B2
(45) Date of Patent: May 12, 2009

(54) FRONT BEZEL WITH LIGHT-GUIDING DEVICE

(75) Inventors: Yun-Lung Chen, Taipei Hsien (TW); Qing-Hao Wu, Shenzhen (CN); Jian Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 25 days.

(21) Appl. No.: 11/766,110

(22) Filed: Jun. 21, 2007

(65) Prior Publication Data

US 2008/0192474 A1 Aug. 14, 2008

(30) Foreign Application Priority Data

Feb. 12, 2007 (CN) .................. 2007 2 0200064 U (51) Int. Cl.
*F21V 17/02* (2006.01)
*G06F 1/16* (2006.01)
(52) U.S. Cl. ..................... 362/277; 362/253; 361/683
(58) Field of Classification Search ................. 362/253, 362/277, 85, 317, 322; 361/683, 816
See application file for complete search history.

(56) References Cited

U.S. PATENT DOCUMENTS

| 5,668,695 | A | * | 9/1997 | Nakamura et al. | .......... 361/683 |
| 6,957,351 | B2 | * | 10/2005 | Emberty et al. | ............. 713/300 |
| 7,436,657 | B2 | * | 10/2008 | Motai et al. | ................. 361/683 |
| 2005/0287852 | A1 | * | 12/2005 | Sugawara et al. | ........... 439/135 |

FOREIGN PATENT DOCUMENTS

TW 092219937 10/2004

* cited by examiner

*Primary Examiner*—Ali Alavi
(74) *Attorney, Agent, or Firm*—Frank R. Niranjan (57) ABSTRACT

A front bezel includes a main body (10) defining a light-pervious area (142) therein, a light-guiding member (20) secured to the main body, a shielding plate (30), and a gear member (40) rotatably secured on the light-guiding member. The light-guiding member has a light-guiding portion (22) defining a space for securing a light source (60) therein. The space communicates and aligns with the light-pervious area. The light-guiding portion defines a sliding slot (254) communicating with the space, for slidably receiving the shielding plate therein. A plurality of teeth (32) is formed on the shielding plate. The gear member has a plurality of teeth (41) meshing with the teeth of the shielding plate, and is rotatable to slide the shielding plate to cover one portion of the space in which the light source is secured, and thereby prevent light of the light source emitting out of the space.

20 Claims, 7 Drawing Sheets

FIG. 7

FRONT BEZEL WITH LIGHT-GUIDING DEVICE

BACKGROUND

1. Technical Field

The present invention relates to front bezels, and more particularly to a front bezel with a light-guiding device.

2. General Background

A light source is usually secured on a front bezel of a computer. A light-guiding member is secured on the front bezel for focusing light generated from the light source on a predetermined portion of the front bezel, thereby illuminating the front bezel when the computer is on. Conventionally, the light source turns on when the computer is turned on. Thus, the light of the light source cannot be turned off when the computer is in use, even if it is so desired.

What is needed, therefore, is a front bezel of a computer which is capable of shielding light generated from a light source when the computer is on.

SUMMARY

A front bezel for a computer includes a main body defining a light-pervious area therein, a light-guiding member secured to an inner surface of the main body, a shielding plate, and a gear member rotatably secured on the light-guiding member. The light-guiding member has a light-guiding portion defining a space for securing a light source therein. The space communicates and aligns with the light-pervious area of the main body. The light-guiding portion defines a sliding slot communicating with the space, for receiving slidably the shielding plate therein. A plurality of teeth is formed on the shielding plate. The gear member has a plurality of teeth meshing with the teeth of the shielding plate, and is rotatable to slide the shielding plate in the sliding slot from one position where the shielding plate covers one portion of the space in which the light source is secured, and thereby prevents light of the light source emitting out of the space, to another position where the shielding plate exposes the portion of the space in which the light source is secured to thereby allow the light of the light source emitting out of the space.

Other advantages and novel features will be drawn from the following detailed description of preferred embodiments with attached drawings, in which:

DETAILED DESCRIPTION OF PREFERRED EMBODIMENTS

Figure 1:
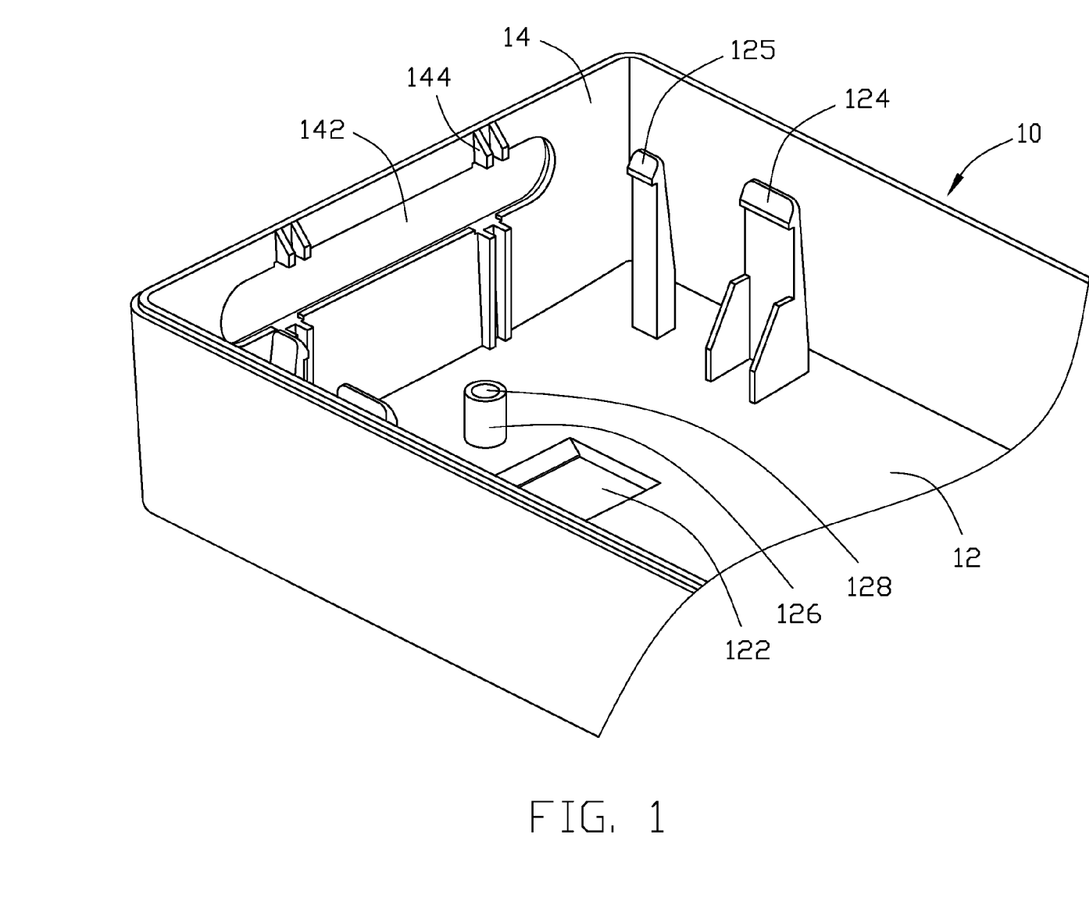
FIG. 1 is an isometric partial view of a main body of a front bezel in accordance with a preferred embodiment of the present invention.
Figure 2:
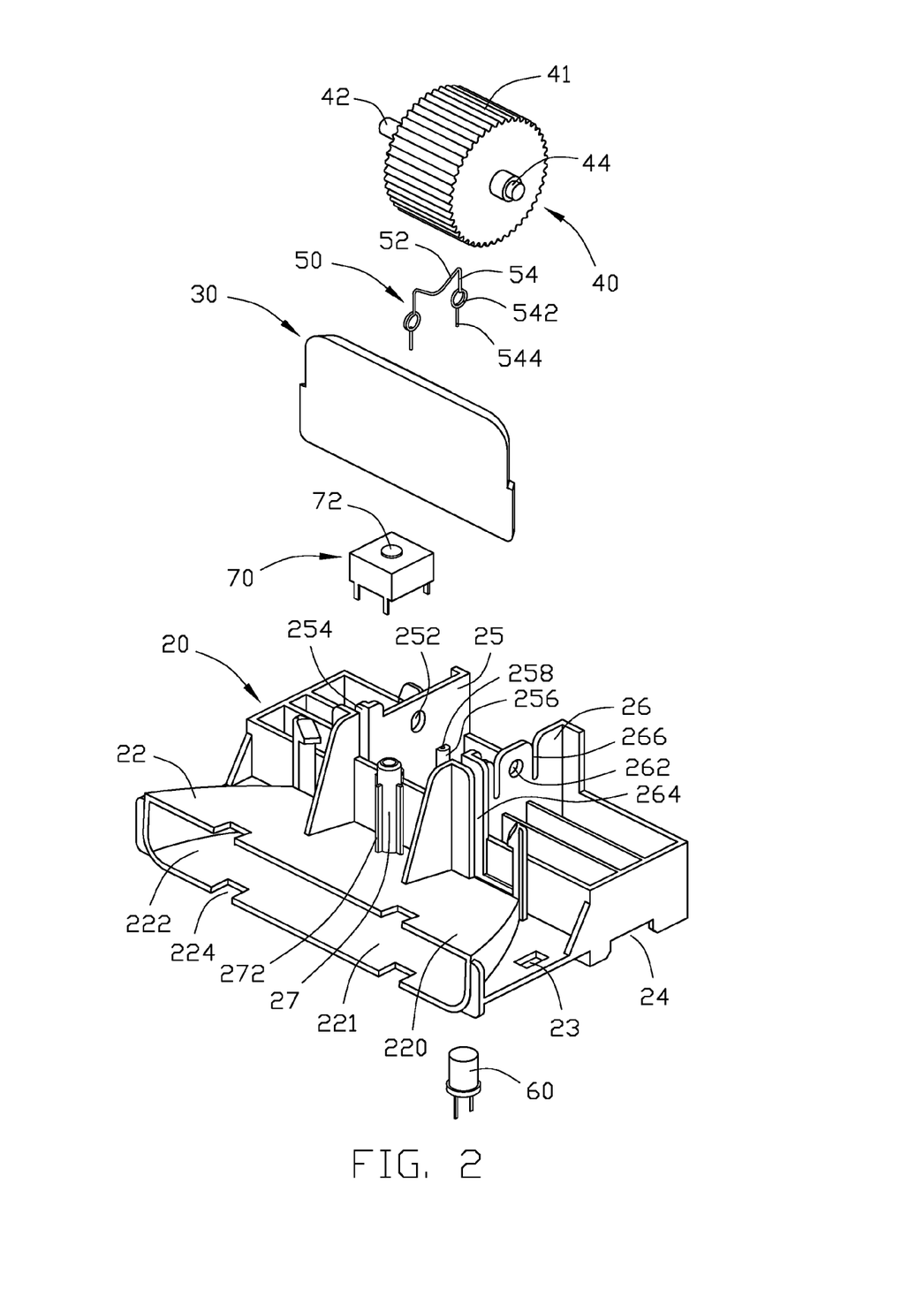
FIG. 2 is an exploded, isometric view of a switch, a light source, and a light-guiding device of the front bezel in accordance with the preferred embodiment of the present invention, the light-guiding device including a light-guiding member, a shielding plate, a resilient member, and a gear member.

Referring to FIGS. 1 and 2, a front bezel of a computer in accordance with an embodiment of the present invention includes a main body 10, a light-guiding device (not labeled), a light source, such as an LED (light-emitting diode) 60, and a switch 70 for controlling power to the computer. The light-guiding device includes a light-guiding member 20, a shielding plate 30, a gear member 40, and a resilient member 50.

The main body 10 includes a first plate 12, and a second plate 14 generally perpendicular to the first plate 12. A through opening 122 is defined in the middle of the first plate 12 adjacent the second plate 14. A post 126 with a mounting hole 128 defined therein protrudes perpendicularly from an inner surface of the first plate 12 between the second plate 14 and the through opening 122. A pair of first hooks 124 protrude perpendicularly from the inner surface of the first plate 12 respectively adjacent opposite edges thereof, and a pair of second hooks 125 respectively adjacent the pair of first hooks 124 also protrudes perpendicularly from the inner surface of the first plate 12. A light-pervious area 142 is defined in the second plate 14. Two guideways 144 are formed perpendicularly from an inner surface of the second plate 14, and follow a path perpendicular to the first plate 12, extending from the first plate 12 to the top edge of the second plate 14 except where the path crosses the light-pervious area 142.

The light-guiding member 20 has a light-guiding portion 22 defining a space therein. The light-guiding portion 22 has an aperture 222 at a front end thereof, communicating the space to outside of the light-guiding member 20. Two cutouts 224 are defined in a top wall 220 and a bottom wall 221 of the light-guiding portion 22 adjacent the aperture 222, for receiving the guideways 144 of the body 10 therein. Two parallel walls 25, 26 are formed on a top surface of the top wall 220 of the light-guiding portion 22. Each of the walls 25, 26 defines a pivot hole 252, 262 therein respectively. The pivot hole 252 is elliptic, and the pivot hole 262 is circular. A sliding slot 254, 264 is defined in each of the walls 25, 26, respectively. An elongated slot is defined in the top wall 220 configured for communicating the sliding slots 254, 264 with the space of the light-guiding portion 22. Two posts 256, each with a securing hole 258 defined therein, protrude from a surface of the wall 25 facing the wall 26. Two cutouts 266 are defined in the wall 26 at two sides of the pivot hole 262, for conveniently deforming a portion of the wall 26 between the cutouts 266. Two locking holes 23 are defined in the light-guiding member 20 at two sides of the light-guiding portion 22 respectively, and two locking cutouts 24 are defined nearby the locking holes 23 respectively. A positioning post 27 with a plurality of ribs 272 formed on outer surface thereof is formed on the top surface of the top wall 220 of the light-guiding portion 22 between the walls 25, 26, corresponding to the mounting hole 128 of the post 126 of the body 10.

Figure 3:
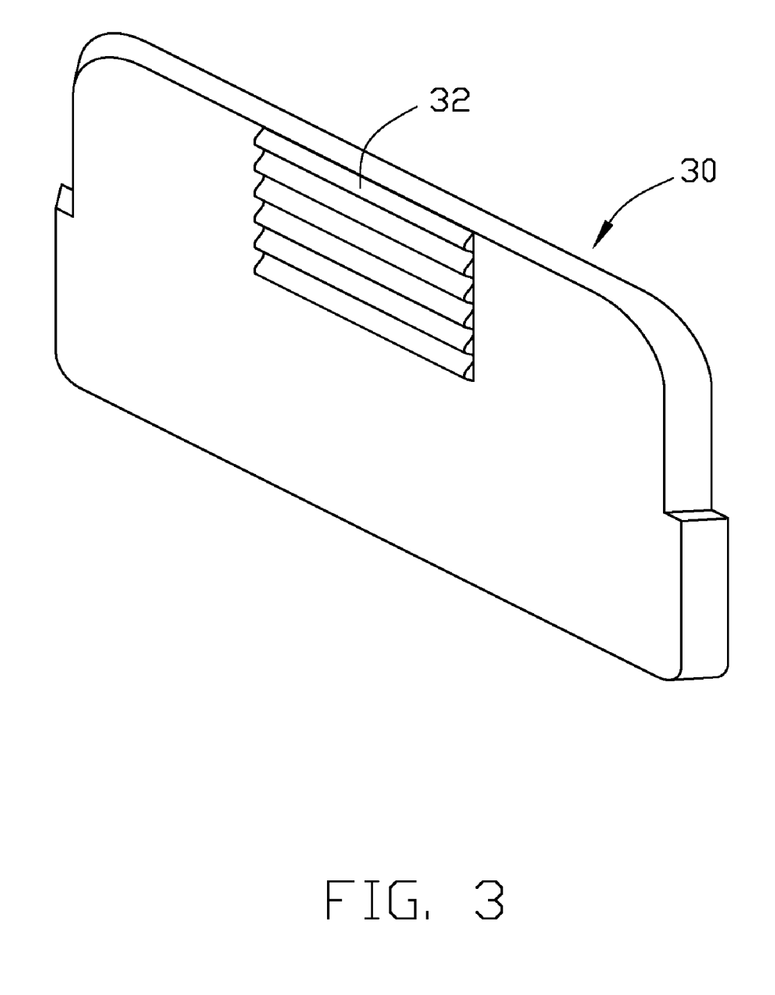
FIG. 3 is another isometric view of the shielding plate of FIG. 2.

Referring to FIG. 3, the shielding plate 30 is configured for being slidably received in the sliding slots 254, 264 of the walls 25, 26. A plurality of teeth 32 protrudes from a surface of the shielding plate 30 adjacent a top edge thereof.

Referring to FIG. 2, the gear member 40 is cylindrical, and includes a plurality of teeth 41 formed thereon for meshing with the teeth 32 of the shielding plate 30. Two pivot posts 42, 44 are respectively formed on end surfaces of the gear member 40. Each of the pivot posts 42, 44 includes a thick portion and a thin portion having a smaller diameter than the thick portion. The thin portion of the pivot post 42 has a greater length than the thin portion of the pivot post 44.

The resilient member 50 includes a V-shaped portion 52 and two inserting ends 54 bent from the V-shaped portion 52. A ring 542 is formed on each of the inserting ends 54.

Figure 4:
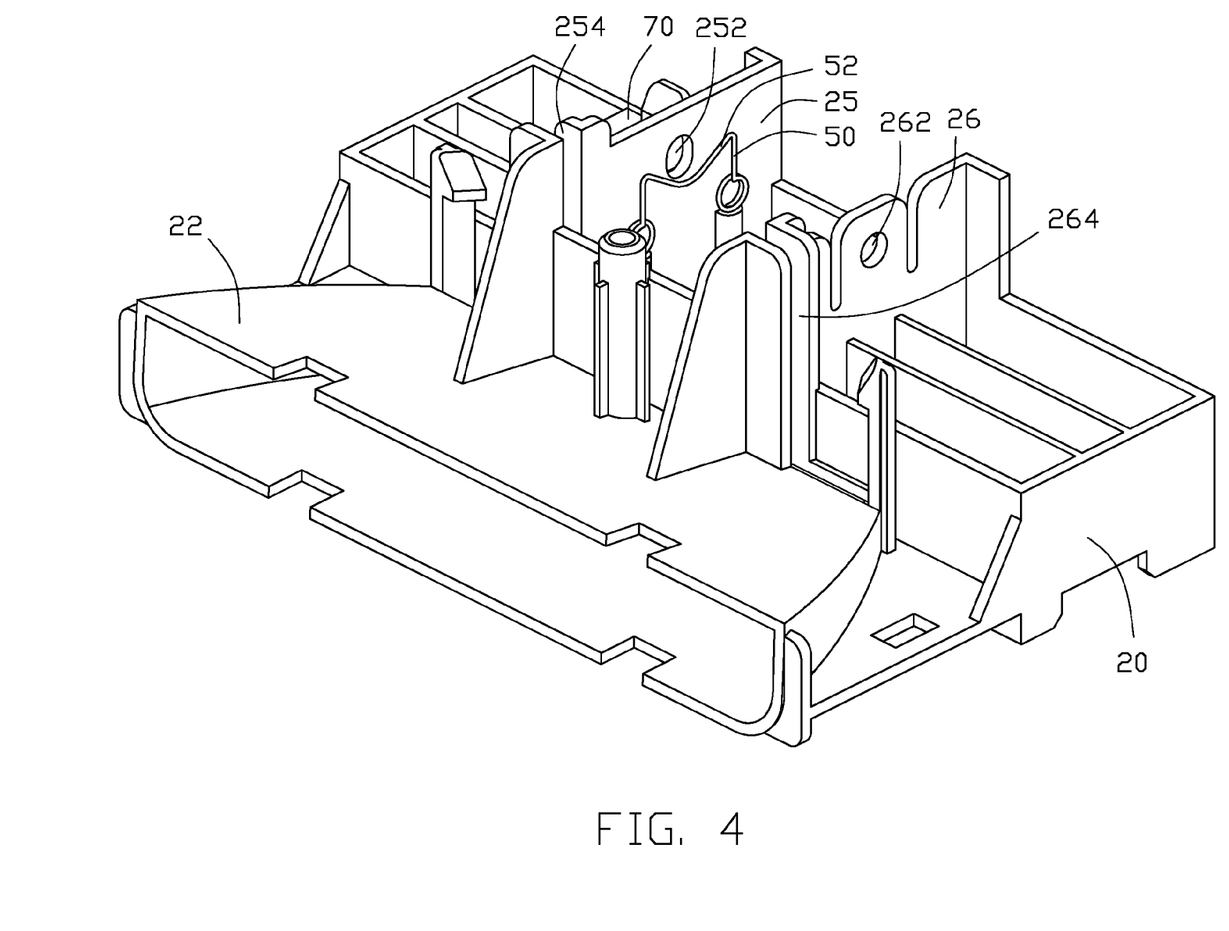
FIG. 4 is an assembled view of light-guiding member, the resilient member, and the switch of FIG. 2.

Referring also to FIG. 4, the inserting ends 542 are respectively inserted into the securing holes 258 of the posts 256 of the wall 25 of the light-guiding member 20. The rings 542 are positioned on top ends of the posts 256. The V-shaped portion 52 of the resilient member 50 is positioned beneath the pivot hole 252 of the wall 25. The switch 70 is secured on the light-guiding member 20 on a side of the wall 25 opposite to the resilient member 50.

Figure 5:
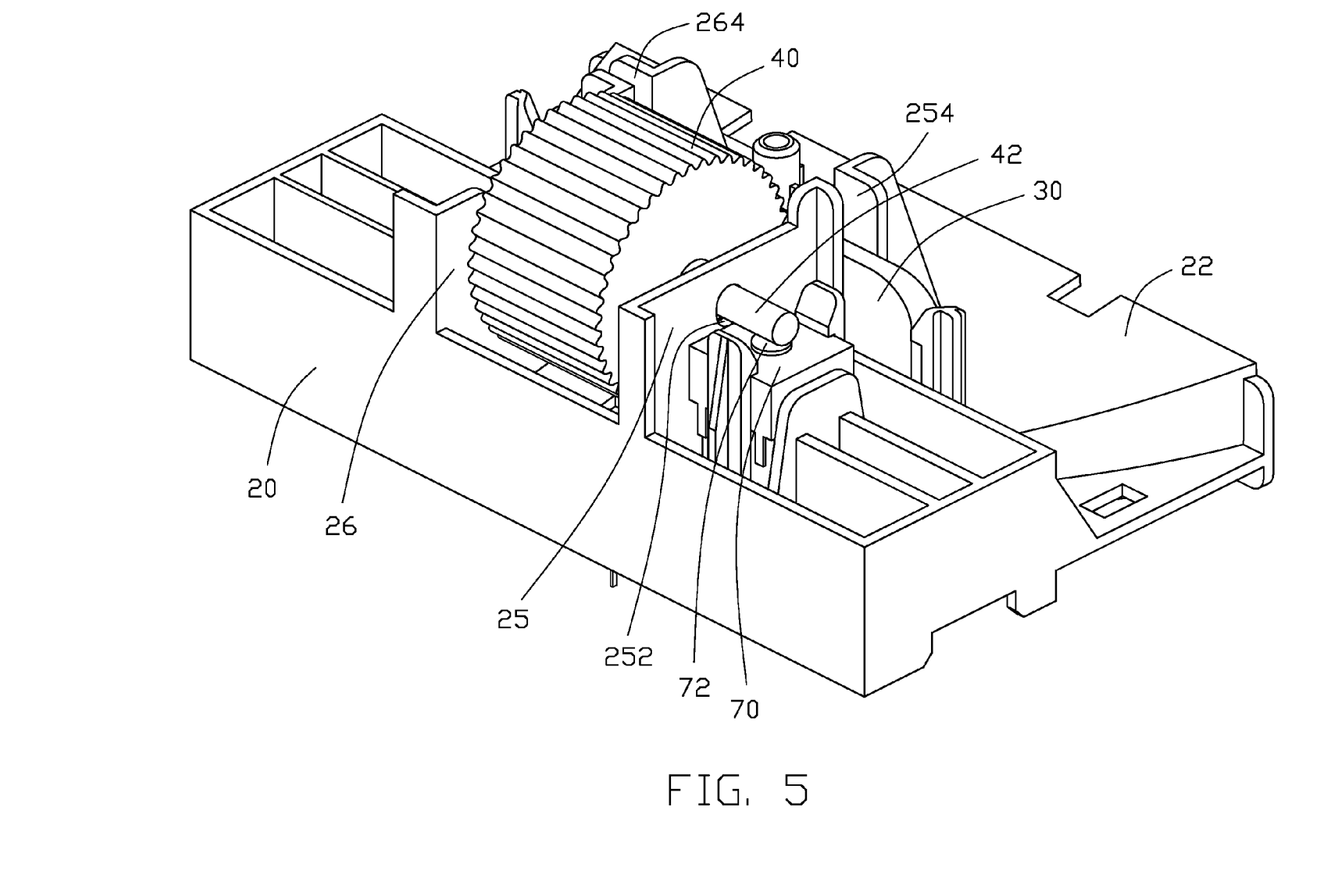
FIG. 5 is an assembled view of FIG. 2, shown from another aspect.

Referring also to FIG. 5, the shielding plate 30 is slidably received in the sliding slots 254, 264 of the walls 25, 26 of the light-guiding member 20. The gear member 40 is located between the walls 25, 26. The thin portion of the pivot post 42 is inserted into the pivot hole 252 of the wall 25 to abut on a button 72 of the switch 70, and the thick portion of the pivot post 42 abuts on the V-shaped portion 52 of the resilient member 50. The thin portion of the pivot post 44 of the gear member 40 is inserted into the pivot hole 262 of the wall 26. The teeth 41 of the gear member 40 mesh with the teeth 32 of the shielding plate 30, so that the shielding plate 30 is capable of sliding in the sliding slots 254, 264 of the walls 25, 26 when the gear member 40 is rotated.

Figure 6:
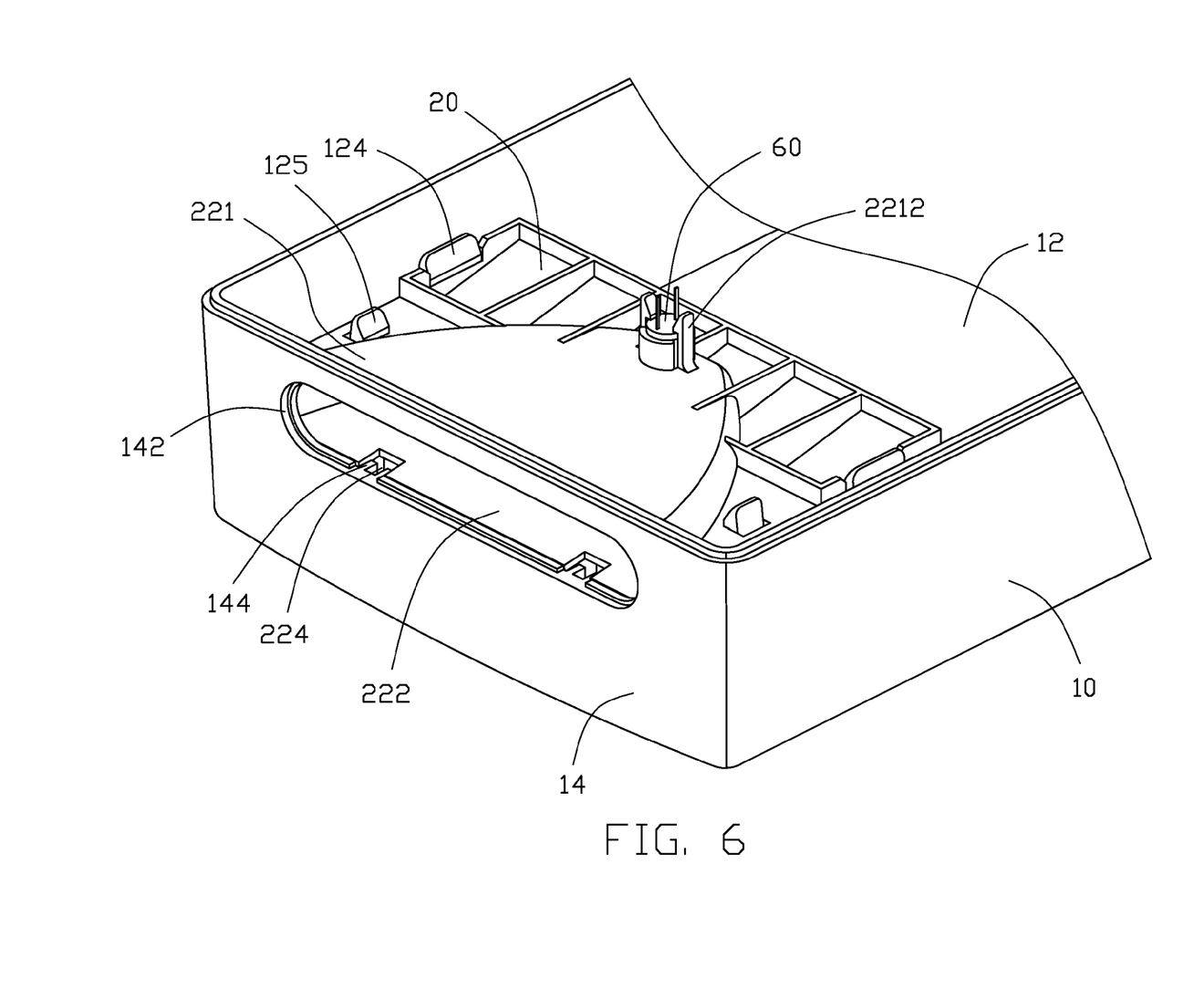
FIG. 6 is an assembled partial view of the front bezel in accordance with the preferred embodiment of the present invention.
Figure 7:
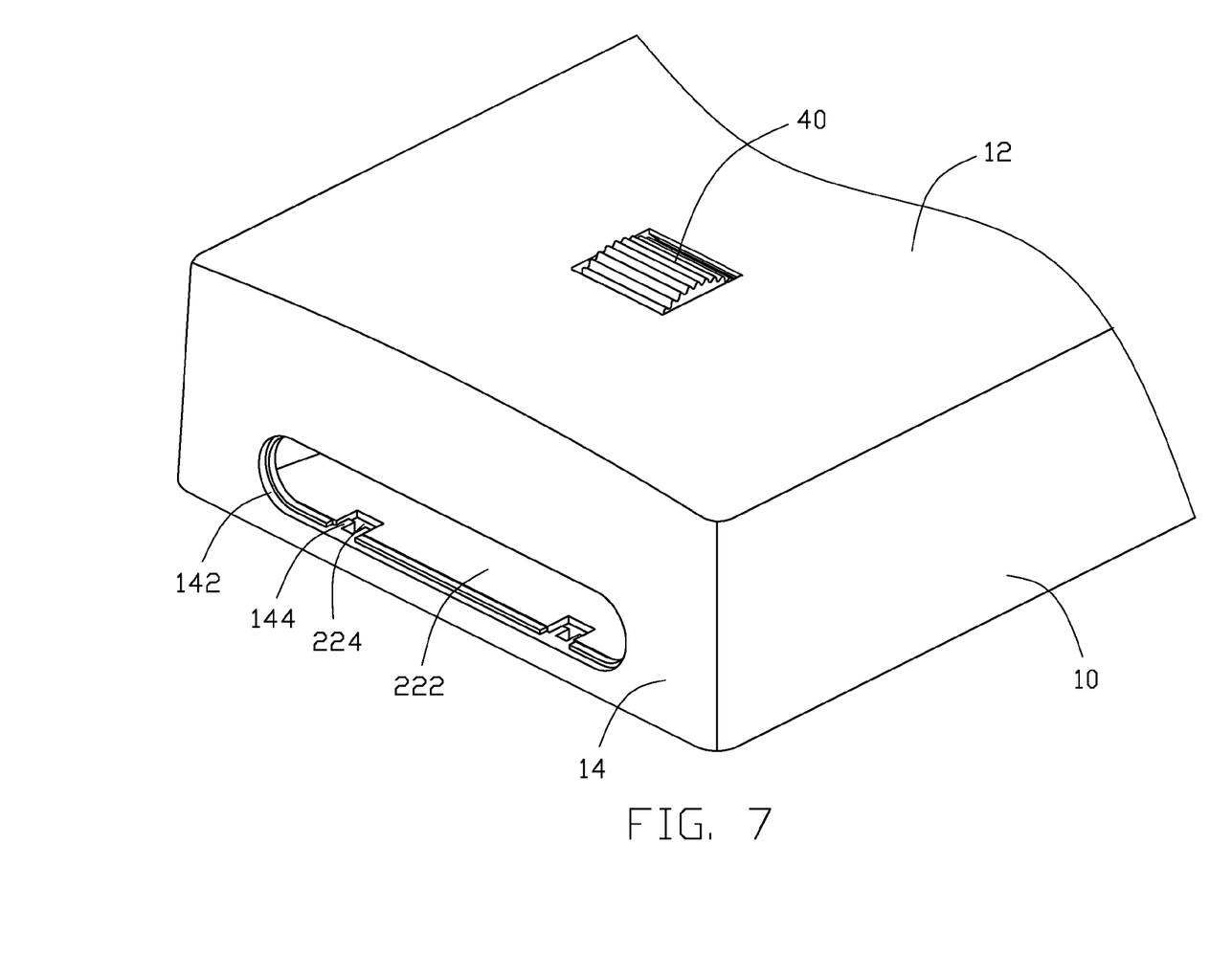
FIG. 7 is similar to FIG. 6, but viewed from another aspect.

Referring also to FIGS. 6 and 7, in assembly, The positioning post 27 of the light-guiding member 20 is inserted into the mounting hole 128 of the post 126 of the body 10, thereby securing the gear member 40 between the walls 25, 26. The cutouts 224 of the light-guiding member 20 receive the corresponding guideways 144 of the second plate 14 of the body 10 therein. The light-guiding member 20 is pressed until the ribs 272 seat on the distal end of the post 126 and the first and second hooks 124, 125 are respectively engaged in the locking holes 23 and the locking cutouts 24 of the light-guiding member 20. The gear member 40 is exposed out of the body 10 via the through opening 122 of the first plate 12 of the body 10. The aperture 222 of the light-guiding portion 22 of the light-guiding member 20 aligns with the light-pervious area 142 of the second plate 14 of the body 10. The light-guiding member 20 is thus secured on the body 10.

The LED 60 is secured in a through hole (not labeled) defined in the bottom wall 221 of the light-guiding portion 22 of the light-guiding member 20 with two hooks 2212 located at opposite sides thereof (shown in FIG. 6). In use, light generated from the LED 60 emits to outside of the body 10 from the light-pervious area 142 of the second plate 14 of the body 10 via the light-guiding portion 22. When it is desired to shield the light of the LED 60, the gear member 40 is rotated in a first direction from outside of the body 10, thereby urging the shielding plate 30 to slide into the space of the light-guiding portion 22 via the elongated slot defined in the top wall 220 until touching the bottom wall 221 of the light-guiding portion 22 such that the shielding plate 30 is located between the LED 60 and the light-pervious area 142 to shield the light of the LED 60 within the space and not be capable of emitting to outside of the body 10 from the light-pervious area 142. When it is desired to allow the light of the LED 60 to emit from the body 10, the gear member 40 is rotated reverse to the first direction to slide the shielding plate 30 along the sliding slots 254, 264 away from the bottom wall 221 of the light-guiding portion 22 of the light-guiding member 20 to thereby allow the light of the LED 60 transmitting through the light-pervious area 142.

In this embodiment, the gear member 40 is also used as a button to control the switch 70 to turn on/off power to the computer. When the gear member 40 is pressed in, the thin portion of the pivot post 42 presses the button 72 of the switch 70, thus activating the switch 70, and at the same time, the thick portion of the pivot post 42 presses the V-shaped portion 52 of the resilient member 50 to resiliently deform. When the gear member 40 is released, the V-shaped portion 52 of the resilient member 50 rebounds to an original state to push the thin portion of the pivot post 42 to an original position. The same procedure is used whether turning on or turning off power to the computer.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A front bezel, comprising:
   a main body defining a light-pervious area therein;
   a light-guiding member secured to an inner surface of the main body, the light-guiding member having a light-guiding portion defining a space for securing a light source therein, the space communicating and aligning with the light-pervious area of the main body, the light-guiding portion defining a sliding slot communicating with the space;
   a shielding plate slidably received in the sliding slot of the light-guiding member, a plurality of teeth being formed on the shielding plate; and
   a gear member rotatably secured on the light-guiding member, and having a plurality of teeth meshing with the teeth of the shielding plate, the gear member being rotatable to slide the shielding plate in the sliding slot from one position where the shielding plate covers one portion of the space in which the light source is secured, and thereby prevents light of the light source emitting out of the space, to another position where the shielding plate exposes the portion of the space in which the light source is secured to thereby allow the light of the light source emitting out of the space.

2. The front bezel as described in claim 1, wherein the main body comprises a first plate and a second plate generally perpendicular to the first plate, the light-pervious area being defined in the second plate, a guideway protruding from an inner surface of the second plate, the light-guiding portion of the light-guiding member defining a cutout for receiving the guideway of the main body therein.

3. The front bezel as described in claim 2, wherein the main body comprises a plurality of hooks protruding from an inner surface of the first plate of the main body, the light-guiding member defining a plurality of locking holes therein for receiving the corresponding hooks.

4. The front bezel as described in claim 3, wherein the first plate of the main body defines a through opening therein, the gear member exposed out of the main body via the through opening.

5. The front bezel as described in claim 1, wherein the light-guiding portion of the light-guiding member defining an elongated slot therein, the sliding slot communicating the space of the light-guiding portion via the elongated slot.

6. The front bezel as described in claim 1, wherein two parallel walls are formed on the light-guiding portion for the gear member being rotatably secured therebetween, each of the walls defining a pivot hole therein, the gear member having two pivot posts rotatably received in the corresponding pivot holes of the walls.

7. The front bezel as described in claim 6, wherein the pivot hole of one of the walls is elliptic, and one of the pivot posts of the gear member comprises a thin portion secured in the elliptic pivot hole and a thick portion positioned at a side of the one of the walls.

8. The front bezel as described in claim 7, wherein a switch with a button is secured on the light-guiding member at the other side of the one of the walls, the thin portion of the pivot post of the gear member extending through the elliptic pivot hole to abut on the button of the switch.

9. The front bezel as described in claim 7, wherein the other one of the walls defines two cutouts at two sides of the corresponding pivot hole for facilitating deformation of one portion thereof, in which the corresponding pivot hole is defined when the gear member is secured to the walls.

10. The front bezel as described in claim 7, wherein a resiliently member is secured on the side of the one of the walls beneath the elliptic hole, and resiliently deformed when the gear member is pressed from outside the main body.

11. The front bezel as described in claim 10, wherein the resilient member comprises a V-shaped portion engaging with the corresponding pivot post of the gear member, and two inserting ends bent from the V-shaped portion and secured on the one of the walls.

12. A light-guiding device, comprising:
a light-guiding member comprising a light-guiding portion for a light source secured therein, the light-guiding portion having an aperture and defining a sliding slot between the aperture and a portion of the light-guiding portion configured for securing the light source;
a shielding plate slidably received in the sliding slot of the light-guiding member, a plurality of teeth being formed on the shielding plate; and
a gear member being rotatably secured on the light-guiding member, and having a plurality of teeth meshing with the teeth of the shielding plate to thereby slide the shielding plate in the sliding slot from one to another of two positions, one position for shielding the light source from the aperture and the another position for revealing the light source to the aperture, when the gear member is rotated.

13. The light-guiding device as described in claim 12, wherein two parallel walls are formed on the light-guiding portion for the gear member rotatably secured therebetween, each of the walls defining a pivot hole therein, the gear member having two pivot posts rotatably received in the corresponding pivot holes of the walls.

14. The light-guiding device as described in claim 13, wherein the pivot hole of one of the walls is elliptic, and one of the pivot posts of the gear member comprises a thin portion secured into the elliptic pivot hole and a thick portion positioned at a side of the one of the walls.

15. The light-guiding device as described in claim 14, wherein a switch with a button is secured on the light-guiding member at the other side of the one of the walls, the thin portion of the pivot post of the gear member extending through the elliptic pivot hole to abut on the button of the switch.

16. The light-guiding device as described in claim 14, wherein the other one of the walls defines two cutouts at two sides of the corresponding pivot hole for conveniently the gear member being secured between the walls.

17. The light-guiding device as described in claim 14, wherein a resilient member is secured on the side of the one of the walls beneath the elliptic hole, and resiliently deformed when the gear member is pressed.

18. The light-guiding device as described in claim 17, wherein the resilient member comprises a V-shaped portion engaging with the corresponding pivot post of the gear member, and two inserting ends are bent from the V-shaped portion and secured on the one of the walls.

19. A front bezel comprising:
a main body comprising a first plate and a second plate perpendicular to the first plate, the first plate comprising at least one hook and an opening, the second plate defining a light-pervious area;
a light-guiding member secured in the main body via the at least one hook, the light-guiding member having a light-guiding portion defining a space for securing a light source therein, the space communicating and aligning with the light-pervious area of the main body, the light-guiding portion defining a sliding slot communicating with the space;
a shielding plate slidably received in the sliding slot of the light-guiding member, a plurality of teeth being formed on the shielding plate; and
a gear member rotatably secured in the main body and being operatable from outside of the main body via the opening, the gear member having a plurality of teeth meshing with the teeth of the shielding plate such that the gear member is rotatable to slide the shielding plate along the sliding slot returnably from one position where the shielding plate enters into the space and covers a portion of the space in which the light source is secured to thereby prevent light of the light source emitting out of the space to another position where the shielding plate exposes the portion of the space in which the light source is secured to thereby allow the light of the light source emitting out of the space to the light-pervious area.

20. The front bezel as claimed in claim 19, wherein a switch with a button is secured on the light-guiding member, the gear member is pivotably attached to the light-guiding member via a pair of posts, one of the posts abutting on the button such that when the gear member is pressed inward the button is pressed to activate the switch.

* * * * *